United States Patent Office 3,024,371
Patented Mar. 6, 1962

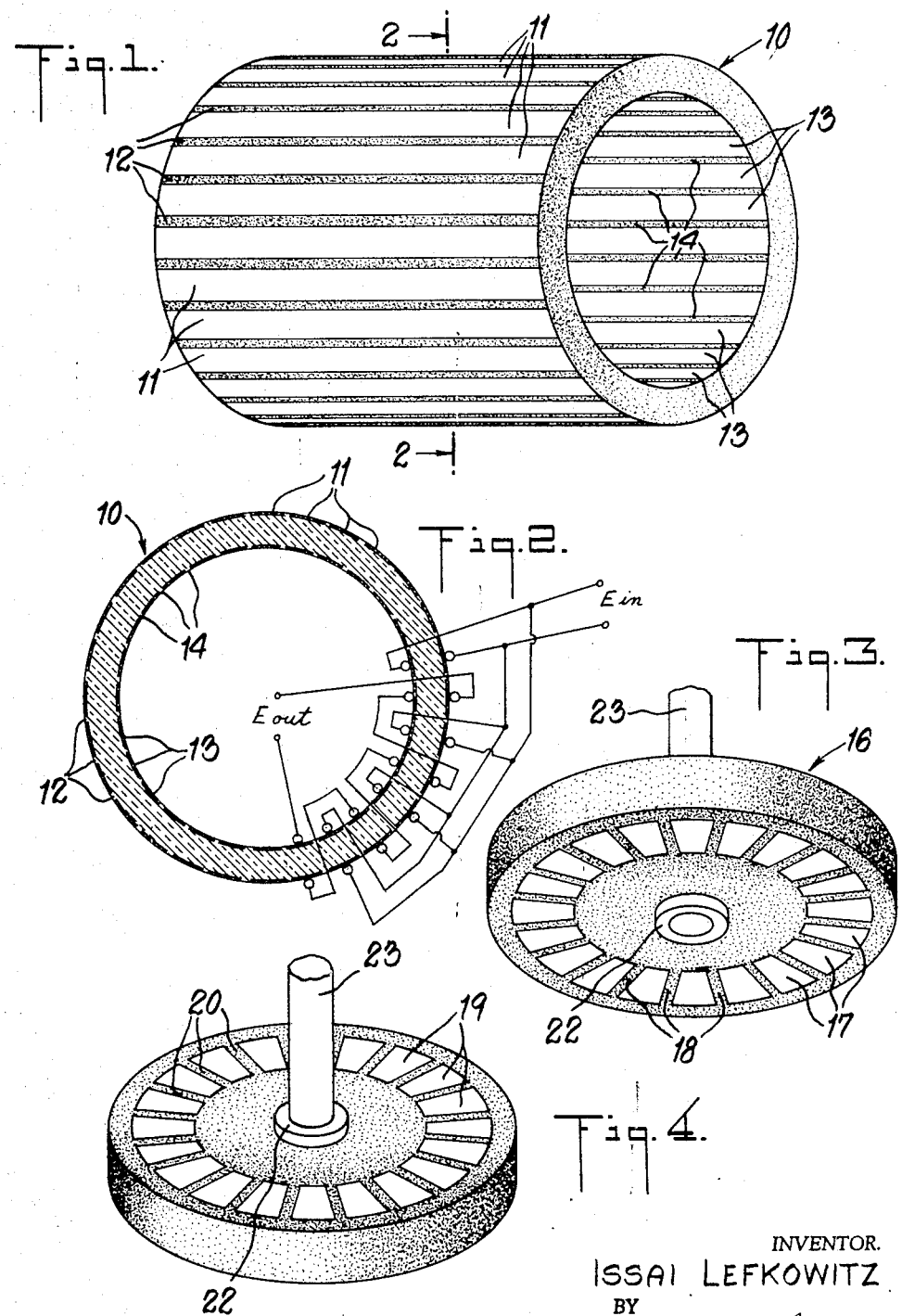

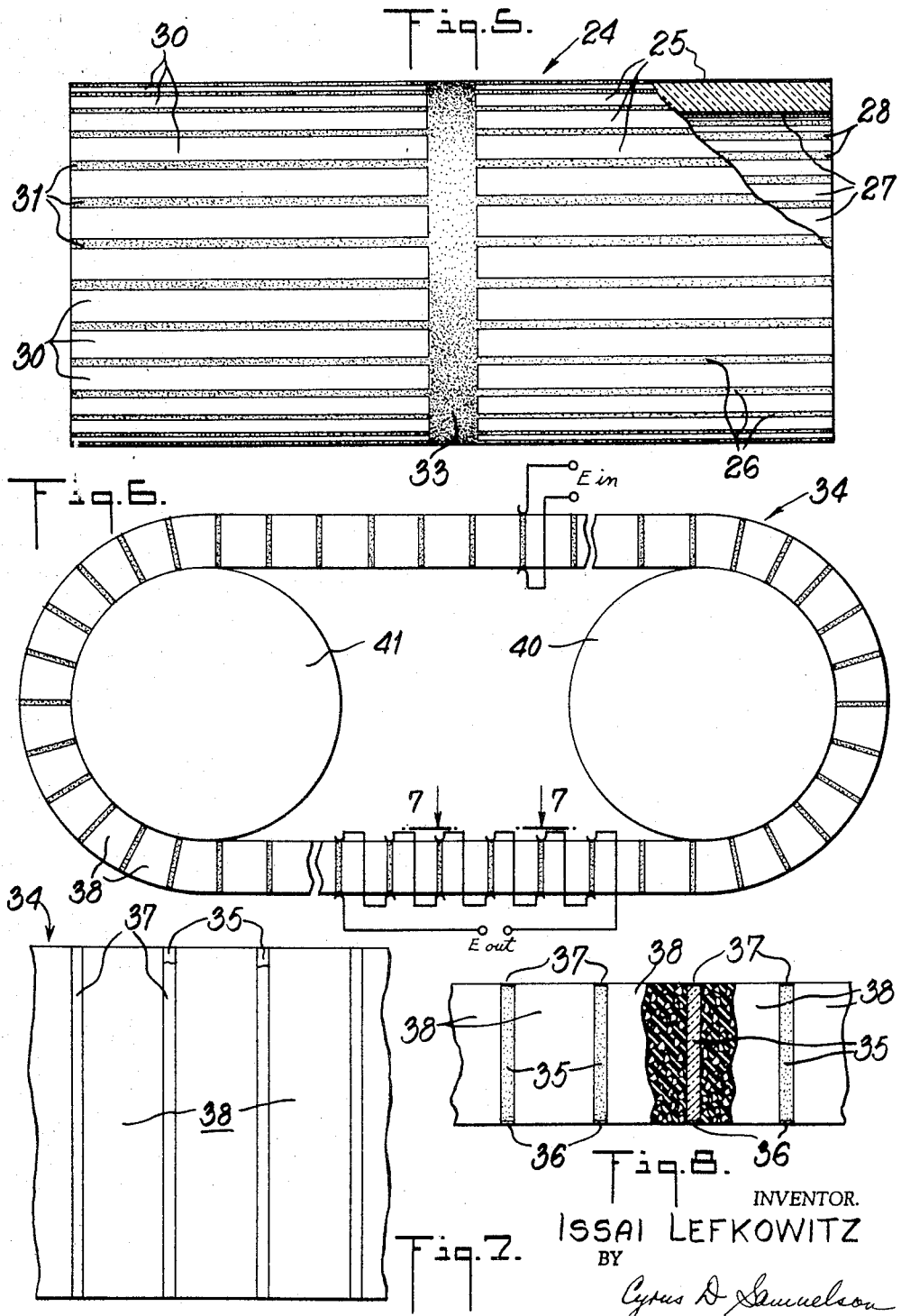

3,024,371
DIELECTRIC GENERATOR
Issai Lefkowitz, Princeton Junction, N.J., assignor to Gulton Industries, Inc., Metuchen, N. J., a corporation of New Jersey
Filed Sept. 5, 1958, Ser. No. 759,238
14 Claims. (Cl. 307—110)

My invention relates to dielectric generators and in particular to those dielectric generators whereby it is possible to obtain a high voltage, direct current output from a low voltage, direct current input.

Devices produced in accordance with the teachings of my invention will produce a high voltage, direct current output from a low voltage, direct current source and I have chosen to call them dielectric generators. By the term "dielectric generator" I mean a device formed of a plurality of capacitors to which is applied a direct-current voltage to charge the capacitors individually and from which a higher direct current output voltage is obtained by discharging a plurality of said charged capacitors in series.

Broadly, my invention comprises the employment of high dielectric materials upon which a plurality of pairs of electrodes are applied on opposite surfaces thereof, charging each of the capacitors, so formed, separately and discharging several of these charged capacitors in series. By this means, the output voltage, obtained upon discharge, is equal to the voltage of the individual charged capacitors multiplied by the number of these charged capacitors which are discharged in series. It is advantageous to utilize a material of as high a dielectric constant as possible. To this end, I have found that the metallic titanates such as barium titanate, combined with or without other metallic titanates, lead titanate-zirconate or any similar materials are satisfactory for carrying out the teachings of my invention. However, it should be understood that any material with high dielectirc constant may be employed in the practice of my invention.

It is an important object of my invention to provide a dielectric generator which produces a high voltage, direct current output from a low voltage, direct current input.

It is a further object of my invention to provide such a device wherein a plurality of capacitors are formed on a single piece of dielectric material.

Other objects, advantages and features of my invention will be apparent during the course of the following description when taken in conjunction with the accompanying drawings wherein:

FIGURE 1 is a perspective view of a device of my invention in the form of a hollow cylinder, FIGURE 2 is a cross-sectional view along the line 2—2 of FIGURE 1, showing a preferred form of electrical connections to the electrodes, schematically.

FIGURE 3 is a perspective view, viewed from below, of a device of my invention in the form of a solid circular disk, FIGURE 4 is a perspective view, viewed from above, of the embodiment of FIGURE 3, FIGURE 5 is a front elevational view, partly broken away, of a further cylindrical embodiment of dielectric generator of my invention, FIGURE 6 is a side elevational view of an endless belt using the teachings of my invention, showing the electrical connections made thereto, schematically, FIGURE 7 is a view of the embodiment of FIGURE 6, viewed in the direction of the arrows 7—7 of FIGURE 6, and FIGURE 8 is an enlarged view of the edge of the belt of the embodiment of FIGURES 6 and 7.

In the drawings, wherein, for the purpose of illustration, are shown preferred embodiments of my invention, the numeral 10 (FIGURES 1 and 2) generally designates a body in the form of a hollow cylinder. Body 10 is preferably formed of material of high dielectric constant such as barium titanate or similar material. Electrodes 11 of silver or similar material are applied to the outer surface of cylinder 10 by evaporation, sputtering, painting, firing or similar techniques well-known in the art and they are insulated from each other by uncovered areas 12 of body 10. In a similar manner, electrodes 13 are applied to the inner surface of body 10, leaving insulating areas 14 therebetween. The electrodes are so spaced on body 10 that they are paired, there being an electrode 13 opposite each electrode 11. Between each pair of electrodes a capacitor is thereby formed. Electrical connections are made as shown schematically in FIGURE 2. I have found it best to connect the input voltage $E_{in}$ and the output voltage $E_{out}$ so that each individual capacitor is alternatively charged and discharged. However, other circuit configurations and connections may also be used in carrying out the teachings of my invention. For example, a circuit similar to that shown in FIGURE 6 may be used in conjunction with the embodiment of FIGURES 1 and 2.

In FIGURES 3 and 4, the numeral 16 generally designates a circular disk of high dielectric material such as barium titanate or similar matter. To the lower surface of disk 16, there is affixed a plurality of electrodes 17 of silver or similar material which are applied to disk 16 by techniques well-known in the art such as evaporation, sputtering, painting, firing or similar techniques. Electrodes 17 are applied so that they are insulated from each other by intervening open areas 18. In a similar manner, electrodes 19 are applied to the upper surface of disk 16 and are insulated from each other by open areas 20. The electrodes 17 and 19 are arranged in pairs opposite each other so that a plurality of capacitors are formed on the disk. Hub 22 is provided in the center of disk 16 to receive shaft 23. Shaft 23 is connected to external rotating means such as a motor (not shown). Electrical connections similar to those shown in FIGURE 2 and any others referred to above may also be employed to carry out the teachings of my invention while utilizing the embodiment shown in FIGURES 3 and 4.

In FIGURE 5, the numeral 24 generally designates a hollow cylinder of material of high dielectric constant similar to that used in the earlier described embodiments. Electrodes 25 of silver or similar material are affixed on the outer surface of body 24 along a portion of the length in the manner heretofore described and are insulated from each other by uncovered areas 26. On the inner surface of cylinder 24, there is applied, in the previously described manner, a plurality of electrodes 27 which are insulated from each other by open areas 28 and which are so arranged that there is an electrode 27 opposite each electrode 25, thereby forming a plurality of capacitors on cylinder 24. Disposed along the length of cylinder 24 and insulated from electrodes 25 is a second plurality of electrodes 30 affixed in the usual manner to the outer surface of cylinder 24 and insulated from each other by open areas 31. There are an equal number of individual inner electrodes insulated from each other opposite electrodes 30 (details not shown). These inner electrodes are insulated from electrodes 28 by an open ring similar to and opposite ring 33. Thus, a second plurality of capacitors are formed on body 24. It should be noted that electrodes 30 and 25 are insulated from each other by open area 33 but that it is also practicable to interlace electrodes 25 and 30 along the length of cylinder 24. In such a case, alternate capacitors are connected in series. It is equally obvious that when electrodes 25 and 30 are affixed to body 24 as shown in the figure, there may be more electrodes 25 than electrodes 30 or vice versa, as dictated by the available input voltage, the desired output voltage and the dielectric constant of the material. Electrical connections similar to those described for the previous embodiments are also utilized in the embodiment of FIGURE 5. However, the voltage output from the parallel string of capacitors 26—28 is utilized to charge the individual capacitors 30-unnumbered which are then discharged in a series string. Thus, it can be seen that there is a dual multiplication obtained with this embodiment of my invention. This technique may be extended to use more than two pluralities of capacitors in carrying out the teachings of my invention.

In FIGURES 6 through 8, the numeral 34 generally designates an endless belt which is comprised of an elastomer of high pliability such as rubber which is bonded to thin sheets of high dielectric constant ceramic such as barium titanate, lead titanate-zirconate or similar material. The elastomer is designated as 38 and the thin sheet ceramic as 35. To the lower and upper surfaces of ceramic 35 there are applied by the usual methods electrodes 36 and 37. As described heretofore, the capacitors may be alternatively connected on the belt to charging and discharging circuits or they may be connected as shown in FIGURE 6. Wheel 40 serves as the drive wheel and wheel 41 serves as the idler wheel. Both wheels are made of insulators such as glass, hard rubber or similar material. Elastomer 38 serves to insulate the adjacent electrodes from each other and also serves to make belt 34 flexible so it will be carried around wheels 40 and 41.

The principle of operation of all of the foregoing embodiments is to charge each capacitor from a voltage source and to discharge a series of these charged capacitors at one time. The power handling capabilities of these devices of my invention are limited by the dielectric strength of the material and the thickness of the material. An important limiting factor on the above is the limiting value of capacity reached as the material thickness is increased.

Since $Q = CV$, the larger C is, the larger is the bound charge that can be obtained per unit time. Also, since $$I = \frac{dQ}{dt}, \text{ then } I = \frac{CdV}{dt} + \frac{VdC}{dt}$$

From this last equation, it can be seen that by decreasing the time increments, either by increasing the speed at which the device is charged and discharged or by decreasing the area of the electrode, it is possible to increase the current handling capabilities of the device.

In the configurations shown and described in this application, the charging and discharging is accomplished by making brush connections, as required, to the electrodes as the devices rotate or move. So that the best way to increase the speed at which the charging and discharging takes place is by increasing the velocity of rotation or movement.

Considering the operation of the cylindrical embodiment of FIGURES 1 and 2, charging voltage is applied to each capacitor from a direct current source (shown schematically) through brushes. The brushes are shown positioned so that they make contact with a pair of opposite electrodes and charge a group of capacitors in parallel. As the cylinder rotates, the charged capacitors are carried around to a second set of brushes which are positioned and interconnected so as to discharge several of the charged capacitors which are connected in series. It can easily be seen that the output voltage will be $n$ times the input voltage where $n$ is the number of capacitors discharged in each step.

The operation of the disk embodiment shown in FIGURES 3 and 4 utilizes brushes for charging and discharging the capacitors (details not shown) and is similar to that of the cylinder of FIGURES 1 and 2 in that the output voltage is determined by the product of the number of capacitors discharged in series and the voltage to which the individual capacitors are charged. The rotation of disk 16 is accomplished by suitably attaching shaft 23 to a driving motor (motor and connection details not shown) in any manner well-known in the art.

The embodiment of FIGURES 6, 7 and 8 is moved by means of drive wheel 40 which is driven by an external motor to which it is suitably coupled (motor and coupling details not shown). The brushes are connected so that each capacitor is separately charged and a series string of several of the charged capacitors is discharged. The output voltage is the product of the number of capacitors in the series string multiplied by the voltage to which the individual capacitor is charged. Wheel 41 serves to keep belt 34 reasonably taut and wheel 40 drives the belt by means of a sprocket on wheel 40 and sprocket holes on belt 34 (details not shown) or by friction or other means.

The device shown in FIGURE 5 is an alternative embodiment of the cylinder of FIGURES 1 and 2. In FIGURE 5, the cylinder 24 is rotated as described heretofore. Each individual capacitor formed by electrodes 25 and 28 is charged from an external, direct current voltage source through a pair of brushes (details not shown). Then a series string of these charged capacitors is discharged through a pair of brushes (not shown) into a single capacitor one electrode of which is a single electrode 30. Brushes (not shown) are also used to make contact with the second set of capacitors. It can be seen that each of these capacitors is charged to a voltage equal to $n$ times the voltage to which each of the first set of capacitors is charged, where $n$ is the number of capacitors in the series string. Now, the second set of capacitors are discharged in a similar series string and the voltage output from them is equal to $nn'V$ where $n'$ is the number of capacitors in the second series string, $n$ is the number of capacitors in the first series string and V is the voltage applied to each of the first set of capacitors. It is obvious and within the scope of my invention to use more than two sets of capacitors in order to obtain further voltage multiplication.

By way of illustration and not by way of limitation of the scope of my invention, following is an example of dielectric generator of my invention:

Cylinder (FIGURE 1): 2″ long, 3″ diameter, barium titanate (dielectric constant=1000)
Number of electrodes: 61 pairs
Discharged: 30 at a time
Capacitor capacity: .1 mf. each
Input voltage: 1000 volts D.C.

Rotational velocity: $\frac{dV}{dt}$ and $\frac{dC}{dt} = 1$

Power output: .25 to .3 mw.

The output is affected by external conditions such as arcing and corona discharge, the effects of which may be minimized by placing the generator in an inert atmosphere such as argon.

Much higher powers may be obtained by increasing the size of the generators of my invention. These dielectric generators lend themselves to use as: replacements for the coil and points of an internal combustion engine, high voltage sources for neon or other gas illuminating devices, a power supply for a Van de Graaff generator or other neutron source and any other devices requiring short duration, high current pulses at high potential.

While I have disclosed my invention in relation to specific examples and in specific embodiments, I do not wish to be limited thereto, for obvious modifications will occur to those skilled in the art without departing from the spirit and scope of my invention.

Having thus described my invention, I claim:

1. A high voltage, direct current, dielectric generator comprising a material of high dielectric constant, a plurality of pairs of electrodes affixed to said material on opposite surfaces thereof forming a plurality of capacitors, means for applying voltage to each such capacitor whereby said capacitor becomes charged, means for moving said material, and means for connecting several of said plurality of charged capacitors in series and discharging them simultaneously whereby a high voltage is obtained, said charging and discharging being accomplished as said material is moved.

2. A dielectric generator as described in claim 1 wherein said material of high dielectric constant is composed largely of titanate.

3. A high voltage, direct current, dielectric generator comprising a disk of material of high dielectric constant, a plurality of pairs of electrodes affixed to said disk on opposite surfaces thereof forming a plurality of capacitors, means for rotating said disk and means for applying voltage to each such capacitor whereby said capacitor becomes charged, means for connecting several of said plurality of charged capacitors in series and discharging them simultaneously whereby a high voltage is obtained, said charging and discharging being accomplished as said disk is rotated.

4. A dielectric generator as described in claim 3 wherein said material of high dielectric constant is composed largely of titanate.

5. A high voltage, direct current, dielectric generator comprising a hollow cylinder of material of high dielectric constant, a plurality of pairs of electrodes affixed to the opposite surfaces of said cylinder forming a plurality of capacitors, means for rotating said cylinder, means for applying voltage to each such capacitor whereby said capacitor becomes charged and means for connecting several of said plurality of charged capacitors in series and discharging them simultaneously whereby a high voltage is obtained, said charging and discharging being accomplished as said cylinder is rotated.

6. A dielectric generator as described in claim 5 wherein said material of high dielectric constant is composed largely of titanate.

7. A high voltage, direct current, dielectric generator comprising an endless belt, said endless belt comprising a plurality of elements of high dielectric material with a second plurality of pliable elements such that there is a pliable element between two successive high dielectric elements, said pliable elements being intimately bonded to said high dielectric elements, a pair of electrodes affixed to each such dielectric element on opposite surfaces thereof forming a capacitor, means for moving said endless belt, means for applying voltage to each such capacitor whereby said capacitor becomes charged and means for connecting several of said charged capacitors in series and discharging them simultaneously whereby a high voltage is obtained, said charging and discharging being accomplished as said belt is moved.

8. A dielectric generator as described in claim 7 wherein said material of high dielectric constant is composed largely of titanate.

9. A high voltage, direct current, dielectric generator comprising a hollow cylinder of material of high dielectric constant, a plurality of pairs of electrodes affixed to the opposite surfaces of said cylinder forming a plurality of capacitors, all said electrodes on each surface of said cylinder being of substantially the same length and width and disposed side by side around the circumference of said cylinder, means for rotating said cylinder, means for applying voltage to each such capacitor whereby said capacitor becomes charged, means for connecting several of said plurality of charged capacitors in series and means for discharging said charged capacitors connected in series simultaneously whereby a high voltage is obtained, said charging and discharging being accomplished as said cylinder is rotated.

10. A dielectric generator as described in claim 9 wherein said material of high dielectric constant is composed largely of titanate.

11. A high voltage, direct current, dielectric generator comprising a hollow cylinder of material of high dielectric constant, a first plurality of pairs of electrodes affixed adjacent one end of said cylinder to opposite surfaces of said cylinder forming a first plurality of capacitors, all of said electrodes on each surface of said cylinder being of substantially the same length and width and disposed side by side around the circumference of said cylinder, the length of said electrodes being shorter than the length of said cylinder, a second plurality of pairs of electrodes being affixed adjacent the opposite end of said cylinder to opposite surfaces of said cylinder forming a second plurality of capacitors, all said electrodes on each surface of said cylinder being of substantially the same length and width and disposed side by side around the circumference of said cylinder, said first and said second plurality of electrodes being insulated from each other, means for rotating said cylinder, means for applying voltage to each of said first plurality of capacitors whereby said capacitor becomes charged, means for connecting several of said first plurality of charged capacitors in series, means for discharging said charged capacitors of said first plurality of capacitors connected in series simultaneously through one of said second plurality of capacitors whereby said capacitor is charged to a first high voltage; means for connecting several of said second plurality of charged capacitors in series and means for discharging said charged capacitors of said second plurality of capacitors connected in series simultaneously whereby a second high voltage higher than said first high voltage is obtained, said charging and discharging being accomplished as said cylinder is rotated.

12. A dielectric generator as described in claim 11 wherein said material of high dielectric constant is composed largely of titanate.

13. A high voltage, direct current, dielectric generator comprising a body formed of material of high dielectric constant, a first plurality of pairs of electrodes affixed to said body on opposite surfaces thereof forming a first plurality of capacitors, a second plurality of pairs of electrodes affixed to said body on opposite surfaces thereof forming a second plurality of capacitors, said first plurality of electrodes and said second plurality of electrodes being insulated from each other, means for moving said body, means for applying voltage to each of said first plurality of capacitors whereby said capacitors become charged, means for connecting several of said first plurality of charged capacitors in series, means for discharging said charged capacitors of said first plurality of capacitors connected in series simultaneously through one of said second plurality of capacitors whereby said capacitor of said second plurality of capacitors is charged to a first high voltage, means for connecting several of said second plurality of capacitors in series and means for discharging said charged capacitors of said second plurality of capacitors connected in series simultaneously whereby a second high voltage higher than said first high voltage is obtained, said charging and discharging being accomplished as said body is moved.

14. A dielectric generator as described in claim 13 wherein said material of high dielectric constant is composed largely of titanate.

References Cited in the file of this patent

UNITED STATES PATENTS

| | | |
|---|---|---|
| 1,796,254 | Nyman | Mar. 10, 1931 |
| 2,047,463 | Dubilier | July 14, 1936 |
| 2,462,804 | Canady | Feb. 22, 1949 |
| 2,610,994 | Bosch et al. | Sept. 16, 1952 |
| 2,716,707 | Kuecken | Aug. 30, 1955 |